United States Patent

Fisher et al.

[11] Patent Number: 4,970,751
[45] Date of Patent: Nov. 20, 1990

[54] ADAPTOR FOR WINDSHIELD WIPER PIN

[75] Inventors: Brian A. Fisher, Burlington; Fuk L. Hui, Markham, both of Canada

[73] Assignee: Tridon Limited, Ontario, Canada

[21] Appl. No.: 338,678

[22] Filed: Apr. 17, 1989

[51] Int. Cl.$^5$ ............................................. B60S 1/40
[52] U.S. Cl. .................................. 15/250.32; 403/163
[58] Field of Search .................. 15/250.31–250.34; 403/3, 152, 163; 16/38, 43; 81/DIG. 11

[56] References Cited

U.S. PATENT DOCUMENTS

| Re. 20,445 | 7/1937 | Newmark | 403/3 |
| 606,995 | 7/1898 | Kirchmer et al. | 15/250.31 |
| 689,553 | 12/1901 | Livingstone | 16/43 |
| 1,342,500 | 6/1920 | Finch | 16/43 |
| 1,344,418 | 6/1920 | McAllister | 16/43 |
| 1,349,088 | 8/1920 | Noelting | 16/43 |
| 1,526,478 | 2/1925 | Jarvis et al. | 16/38 |
| 2,422,327 | 6/1947 | Winslow | 403/152 |
| 3,128,495 | 4/1964 | Tooth | 16/43 |
| 3,789,562 | 2/1974 | De Chicchis et al. | 403/3 |
| 3,916,736 | 11/1975 | Clemens | 81/DIG. 11 |
| 3,942,220 | 3/1976 | Wood et al. | 16/43 |
| 4,209,874 | 7/1980 | Hancu | 15/250.32 |
| 4,321,725 | 3/1982 | Journee | 15/250.32 |
| 4,347,640 | 9/1982 | Durtnal | 15/250.32 |
| 4,446,589 | 5/1984 | Maiocco | 15/250.32 |
| 4,697,948 | 10/1987 | Fukuda | 403/163 |

FOREIGN PATENT DOCUMENTS

| 1278498 | 10/1961 | France | 403/163 |
| 2035065 | 6/1980 | United Kingdom | 15/250.32 |
| 2041729 | 9/1980 | United Kingdom | 15/250.32 |
| 2072497 | 10/1981 | United Kingdom | 15/250.32 |

Primary Examiner—Philip R. Coe
Assistant Examiner—Joseph S. Machuga
Attorney, Agent, or Firm—Rogers & Scott

[57] ABSTRACT

An adaptor for fitting a small diameter wiper arm pin to a large diameter hole in a wiper superstructure comprises at least one element of which the inner surface defines a cavity to receive the small diameter pin. The outer surface of the pin adaptor defines an outside diameter which exceeds the diameter of the pin and is adapted to fit the large diameter hole. Preferably, a pair of complementary elements are provided to encase the pin and the outer surface further defines a groove to receive a leaf spring of a conventional wiper connector assembly. An aligning flange cooperable with a slot in the wiper assures correct alignment of the adaptor in the superstructure.

3 Claims, 2 Drawing Sheets

ADAPTOR FOR WINDSHIELD WIPER PIN

This invention relates to an adaptor for a windshield wiper pin of the kind that has at least one groove provided between its ends to receive a leaf spring for connecting the pin to a windshield wiper superstructure.

Whereas there has been some standardization of sizes for automotive parts, some manufacturers have recently departed from these standards and have adopted arm pins for windshield wipers in which the maximum outside diameter, 6.4 mm, is substantially greater than the diameter of pins which were used in the past, namely 4.8 mm. Windshield wipers manufactured for the new, larger diameter arm pins have a correspondingly larger diameter hole in the superstructure to accomodate the pins.

As a consequence, there exists a large number of automobiles built before the development of large hole wiper superstructures that have windshield wiper arms provided with relatively small diameter pins.

The object of this invention is to provide an adaptor which will allow a small diameter pin of a windshield wiper arm to be used with windshield wipers of the type in which the superstructure has a relatively large diameter hole.

In accordance with the invention, there is provided an adaptor for use with wiper arm pins of the above-mentioned type having a small diameter, the adapter comprising at least one element of which the inner surface defines a cavity to receive the pin. The outer surface defines an outside diameter for the adaptor which exceeds the diameter of the pin and is adapted to fit the large diameter hole of the new windshield wiper superstructrues.

In a preferred embodiment, the adaptor comprises two complementary elements of which the outside surfaces are shaped to define a groove adapted to receive a leaf spring so that the wiper arm will be connected to the wiper superstructure in conventional fashion.

A preferred embodiment of the invention is described below with reference to the accompanying drawings, in which.

Figure 1:
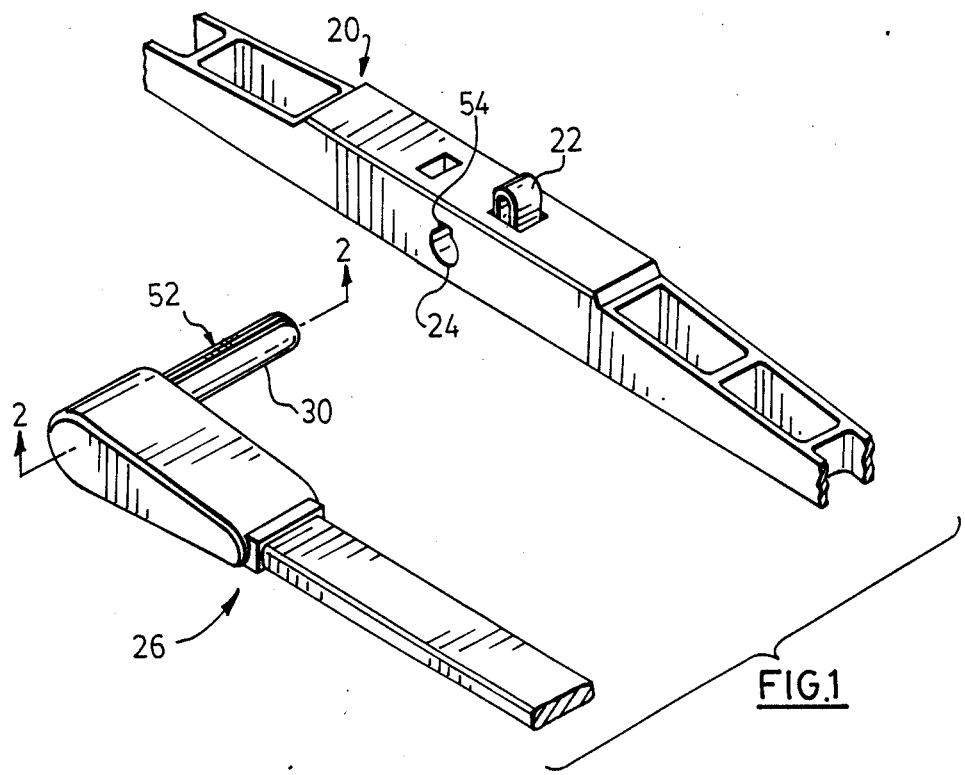
FIG. 1 is a perspective view illustrating a windshield wiper superstructure and a wiper arm provided with a pin for connection to the superstructure which is encased in an adaptor according to the invention.

Referring firstly to FIG. 1, there is illustrated the main yoke of a windshield wiper superstructure, generally indicated by the numeral 20, of which the ends have been broken away. A connector assembly for connection to a wiper arm pin is provided between the ends of the main yoke and includes a conventional leaf spring suspended from the superstructure 20 in a through hole 24 and accessible by a leaf spring extension 22.

A windshield wiper arm, spaced from and substantially parallel to the wiper superstructure 20 is generally indicated by the numeral 26, and carries a transversely extending small diameter pin 28 (FIG. 2) which is encased in a pin adaptor 30 according to the invention to make it fit the relatively large diameter hole 24.

Figure 2:
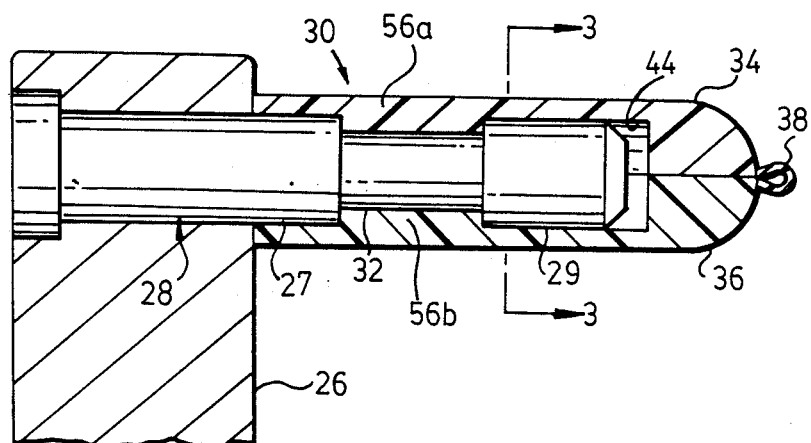
FIG. 2 is a perspective view along line 2—2 of FIG. 1 showing the relationship of the pin to the adaptor.
Figure 4:
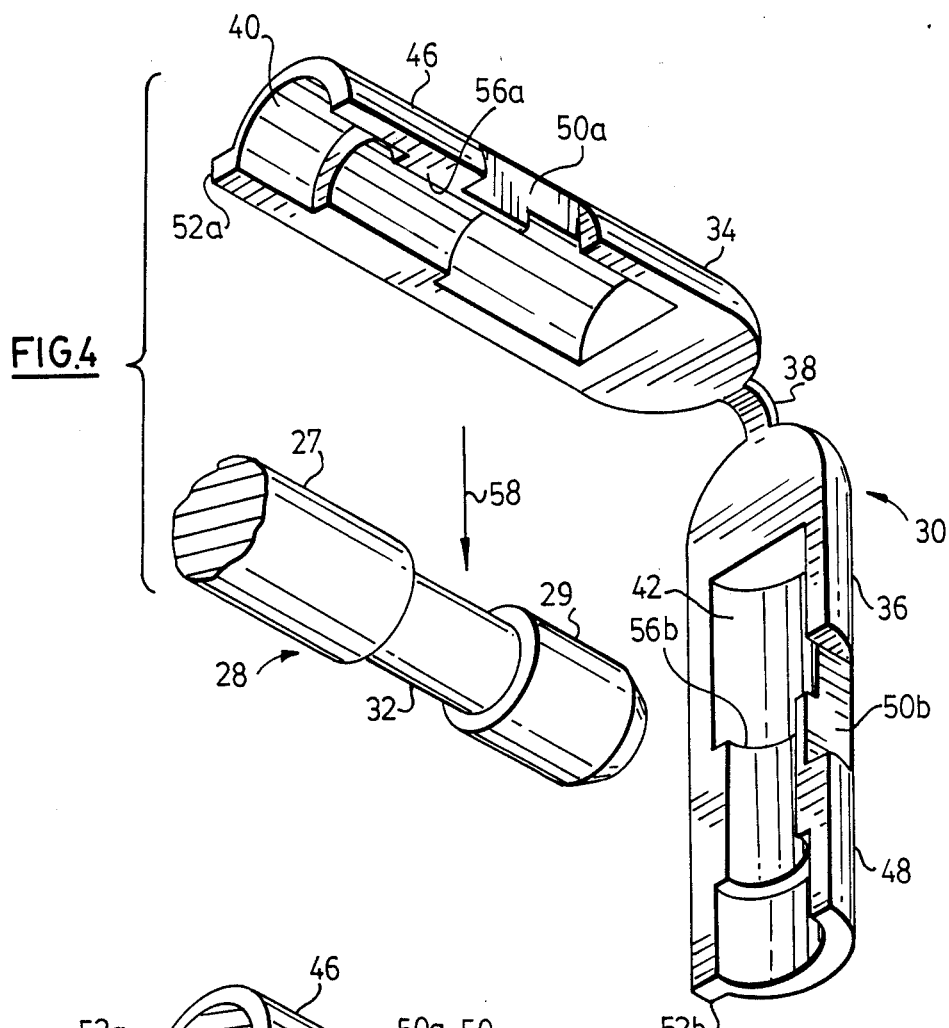
FIG. 4 is an exploded view showing the adaptor removed from the pin.

As can be seen more clearly in FIGS. 2 and 4, the pin 28 is provided between an inner end 27 and an outer end 29, with a groove 32 adapted to receive the leaf spring of the connector assembly in conventional fashion.

The adaptor 30 comprises complementary first and second elements 34, 36 connected by a web 38 and integrally moulded from synthetic plastic material.

The elements 34, 36 are mirror images of each other and have respective concave inner surfaces 40, 42 (FIG. 4) adapted to meet at a common parting plane to define a cavity 44 (FIG. 2) for receiving the pin 28. In a closed configuration of the adaptor 30 in which the elements meet at the common parting plane, respective convex outer surfaces 46, 48 of the first and second elements 34, 36 define an outside diameter for the adaptor 30 which exceeds the maximum outside diameter of the pin 28, thereby allowing the small diameter pin to fit the large diameter hole 24 of the superstructure 20.

An adaptor groove 50, defined by complementary recesses 50a, 50b formed on the outside surface of the elements adjacent the common parting plane, is adapted to receive the leaf spring 22 in conventional fashion.

In order to facilitate correct alignment of the encapuslated pin in the hole 24 such that the adaptor groove 50 will be oriented to receive the leaf spring, the adaptor 30 is provided with an outwardly directed flange 52 which lies opposite the groove 50 and is adapted to fit a keyway type slot 54 formed in the hole 24 of the wiper superstructure 20. The flange 52 is defined by complementary lips 52a, 52b which project outwardly along the length of the adaptor and are adapted to mate at the parting plane.

To hinder longitudinal movement of the pin 28 relative to the adaptor 30, the inner surfaces of the elements are shaped to define respective inwardly directed shoulders 56a, 56b which in the closed, operative configuration of the adaptor engage the pin groove 32 and encircle the pin 28.

Figure 5:
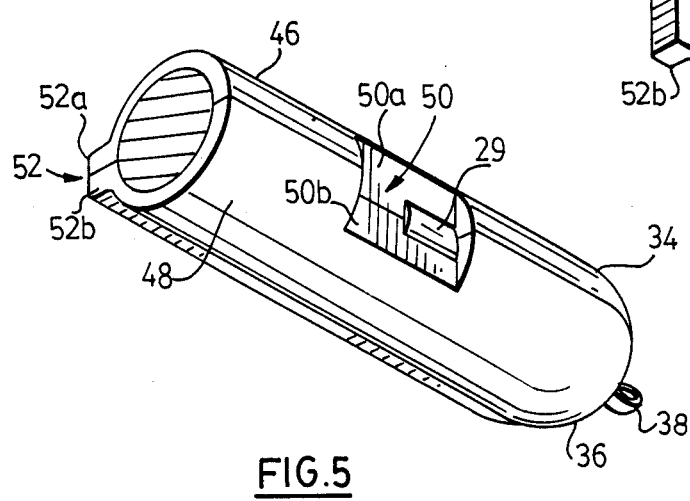
FIG. 5 is a perspective view showing the assembly of FIG. 4 with the pin encased in the adaptor.

So that the adaptor groove 50 has at least the same width as the pin groove 32, it will be appreciated that the shoulders 56a, b are longitudunally spaced from the adaptor groove 50. In the embodiment illustrated, the adaptor groove 50 and the pin groove 32 partially overlap and the wall thickness of the adaptor between the inner and outer surfaces is thin enough that in the assembled configuration, shown in FIG. 5, part of the outer end 29 of the pin is exposed by the adaptor groove 50.

Figure 3:
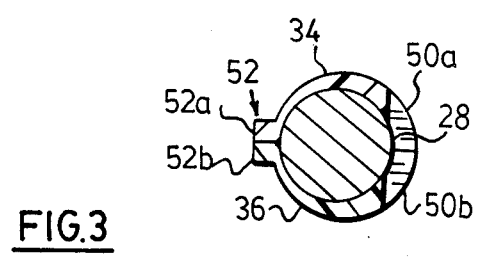
FIG. 3 is a cross-sectional view taken along line 3—3 of FIG. 2.

Furthermore, it will be appreciated that the outer surface for the adaptor defined by respective outer surfaces 46, 48 of the first and second elements, are not concentric with the longitudinal axis for the cavity 44, the wall thickness of the adaptor between the inner surfaces 40, 42 and the outer surfaces 46, 48 being greatest on the side opposite from the flange 52 (or constituting lips 52a, 52b) in order to accommodate the groove 50. This is most clearly seen in FIG. 3.

In use, the first element 34 of the adaptor 30 is located on the pin 28 with the associated shoulder 56a engaging the pin groove 32 by a movement transverse to the pin axis as indicated by arrow 58 in FIG. 4. The second element 36 is folded about the web 38 to enclose the pin 28 such that the associated shoulder 56b engages the pin groove 32 and the complementary lips 52a, b mate at the parting plane.

The encapsulated pin is then inserted into the wiper superstructure with the flange 52 received in the complementary slot 54. The leaf spring of the connector assembly locates in the adaptor groove 50 and the wiper installation is complete.

It will be appreciated that several variations may be made to the above described embodiment of the invention without departing from the scope of the claims. For example, it will be appreciated that the shape and configuration of the locating flange may vary considerably and could also be dispensed with entirely.

Furthermore, the adaptor may comprise a single element which increases the effective diameter of the pin sufficiently on one side thereof to leave the other side of the pin exposed so that the leaf spring of a connector assembly can engage the groove of the pin itself.

We claim:

1. An adaptor for the arm pin of a windshield wiper, the pin having an end connected to a wiper arm and a free end of pre-determined maximum outside diameter adapted to fit a small diameter hole in a first wiper superstructure, a groove being provided between the ends of the pin to receive a leaf spring for connecting the pin to said wiper superstructure, the adaptor comprising:

first and second elements having respective inner and outer surfaces, the inner surfaces defining a cavity adapted to receive the pin and having a longitudinal axis, inwardly directed shoulders being provided in the cavity to engage the groove of the pin so as to hinder longitudinal movement of the pin relative to the adaptor; and the outer surfaces defining an outside diameter for the adaptor which exceeds said maximum outside diameter of the pin to allow the pin to fit a larger diameter hole in a second wiper superstructure, said outer surfaces being eccentric to said longitudinal axis so as to accomodate a groove formed in said outer surfaces and adapted to receive and locate a leaf spring for connection to said second wiper superstructure.

2. Adaptor according to claim 1 provided with an outwardly directed guiding flange adapted to engage a complementary slot in the large diameter hole of said second wiper superstructure whereby the adapter may be aligned in said second wiper superstructure so that the associated groove formed in the outer surface of the adaptor is positioned to receive a leaf spring having a pre-determined location in said second wiper superstructure.

3. Adaptor according to claim 1 integrally moulded from synthetic plastic material and including a web which connects said first and second elements so that the respective inner surfaces will meet to define said cavity.

* * * * *